Aug. 23, 1960

D. N. MacDONALD 2,950,005

CARD SORTER

Filed Aug. 10, 1956

INVENTOR.
DUNCAN N. MACDONALD

BY

Christie, Parker & Hale

ATTORNEYS

Aug. 23, 1960

D. N. MacDONALD 2,950,005

CARD SORTER

Filed Aug. 10, 1956

INVENTOR.
DUNCAN N. MACDONALD

BY

Christie, Parker & Hale

ATTORNEYS

Aug. 23, 1960

D. N. MacDONALD 2,950,005

CARD SORTER

Filed Aug. 10, 1956

INVENTOR.
DUNCAN N. MAC DONALD
BY
Christie, Parker & Hale
ATTORNEYS

United States Patent Office 2,950,005
Patented Aug. 23, 1960

2,950,005

CARD SORTER

Duncan N. MacDonald, Arcadia, Calif., assignor to Burroughs Corporation, Detroit, Mich., a corporation of Michigan Filed Aug. 10, 1956, Ser. No. 603,428

5 Claims. (Cl. 209—74)

This invention relates generally to automatic business machines and, more particularly, is concerned with apparatus for sorting record members or file cards upon which data has been magnetically recorded.

The use of record members or individual information cards on which information is stored in electrically or mechanically detectable form is well known. For instance, a common system of automatic business accounting is provided by cards on which account information is stored as punches in the card, the position of the punches being indicative of the alphanumeric information stored thereon. An alternative method of storing information has been proposed in which cards having surfaces coated with a magnetic oxide are used, the information being stored as magnetic bits on the surface of the card.

It is necessary in any accounting operation to sort the cards into groups automatically. For instance, it might be desirable to separate the cards into groups according to the first letter of the surname of an individual whose account is represented by a particular card. The card sorting machine provides a means for automatically running through a large group of cards and separating out the cards into groups according to any pre-set classification.

One type of card sorter heretofore proposed for use in conjunction with punched cards senses the information on the card which forms the basis of the card-sorting classification, and in response to the sensed information directs the cards along different paths to a plurality of different stacking positions. The number of stacking positions into which the cards can be sorted is quite limited in such a system since it involves a complicated mechanical arrangement to divert the cards at one point along a plurality of separate paths.

In a second type of punch card sorter heretofore proposed, the sensed information is stored mechanically in the form of trip levers accompanying each card. The cards are directed successively past a plurality of sorting positions and as each card passes a pocket, its combination of levers which travels with the card is sensed and if coincidence is ascertained at a given stacking position, the card is allowed to drop into the associated sorting pocket. This type of sorter overcomes the limitations of the previously described sorter as to the number of pockets which can be readily incorporated into the machine. However, the provision of levers or other mechanical means which can be readily re-set on each of the cards has not proved particularly successful from a practical standpoint.

The present invention is an improvement over the prior art practices in that it provides a card sorting machine which is capable of sorting cards into a large number of stacks, of the order of forty or more, according to any predetermined classification of information stored on the cards. This is accomplished without levers or other complicated memory means which must be provided in combination with each card.

To this end, the present invention contemplates a sorting machine in which information, on which the sorting is based, is sensed and stored as an erasable sorting mark which may be a magnetic sorting bit along one edge of the card. The position of the magnetic bit is indicative of the information sensed. Thus, a different position is provided for each of a large number of different characters which may be stored as information on the card. The cards are then routed successively past a plurality of stacking positions, each of which includes means for sensing the magnetic bits stored along the edge of the card. Each stacker or sorting position responds to a magnetic bit recorded in a different position on the respective cards, whereby the cards are stored in selected positions according to the position of the magnetic sorting bits stored on the edge of each of the cards in response to the sensed information thereon. Since the magnetic bits can be readily erased, the cards can be re-sorted any number of times according to a different basis of classification, i.e., according to information sensed in a different position on the card.

For a better understanding of the invention, reference should be had to the accompanying drawings, wherein.

Figure 1:
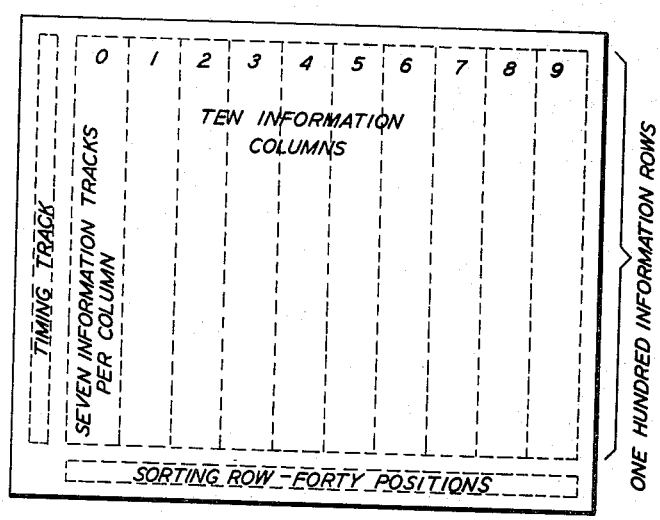
Fig. 1 shows a suitable information card with which the apparatus of the present invention is particularly adapted to be utilized.

Referring to Fig. 1, the arrangement of a typical record member in the form of a magnetic card for use in the apparatus of the present invention is shown. The card preferably is in the form of a paper or plastic sheet having one surface thereof coated with a magnetic oxide coating in a manner well known in the magnetic tape recording art. The coated alphanumeric characters are recorded on the card in ten vertical columns comprising seven tracks each, each of the ten columns being divided into one hundred information positions constituting horizontal rows across the card. So that the information stored on the card may be used directly in digital computers of the binary coded decimal type, it is desired that each of the approximately fifty alphanumeric characters generally used in standard business machines be represented as a decimal number which is stored in binary coded form on the magnetic card. For this reason, the first three tracks in each column are used to store in binary form the most significant digit, the three tracks permitting the storage of the decimal numbers 0 through 7. The least significant digit is stored in the remaining four tracks in binary form, the four tracks permitting storage of the binary coded decimal digits 0 through 9.

In addition to the seventy tracks forming the ten columns across the card for storage of information, a timing track is provided along the left-hand edge of the card by means of which a clock pulse may be derived whereby each of the one hundred horizontal information rows is delineated.

Figure 2:
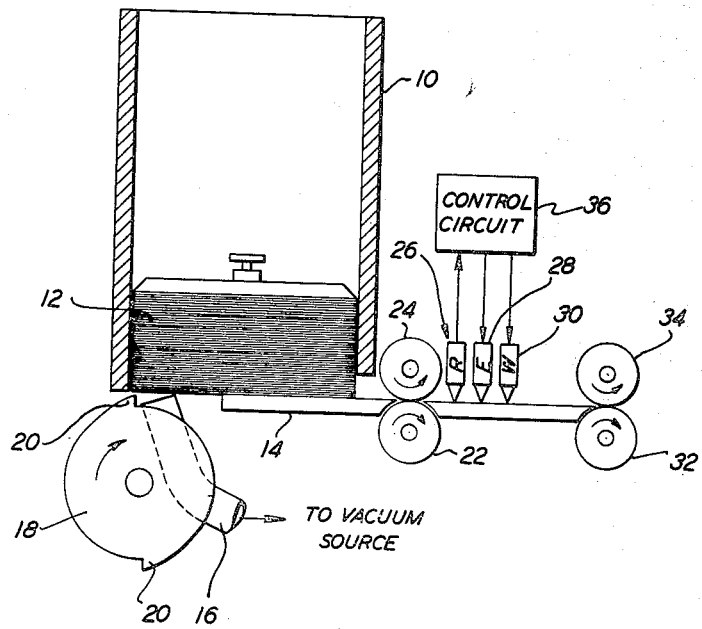
Fig. 2 is a diagrammatic view of a card-picking and information sensing station and the associated feed mechanism for the information cards.

The cards to be sorted are stacked in a card-picking device, such as shown in Fig. 2. The card-picking device includes a vertical rack 10 which receives the cards, such as indicated at 12, in stacks. The card stack is supported by a stack support plate 14 which extends across substantially half the card width. Connected to a vacuum source (not shown) is a pipe 16 which extends to a point just below the stack of cards 12 adjacent the portion of the lowest card in the stack exposed beyond the edge of the support plate 14. The action of the vacuum pipe 16 is to bend the edge of the bottom card of the stack downwardly so as to engage a rotating picker-wheel 18. The wheel 18 has two lugs 20 spaced around the periphery thereof and positioned to individually engage the edge of the bottom card when it is pulled down by the vacuum pipe 16.

The engaging lugs 20 by rotation of the wheel 18 push the card forward, sliding the bottom card out from beneath the stack into engagement with a pair of feed rollers 22 and 24. The feed rollers advance the card past a row of reading heads, such as indicated at 26, there being seventy such reading heads in the row arranged to read out the magnetic bits stored in the respetcive tracks in each of the ten columns of information on the magnetic card. There is an additional read head in the same row of read heads arranged to read out the clock pulses along the edge of the magnetic card. As the card advances past the read heads 26, it passes successively under a row of erase heads 28 and a row of write heads 30, of which there are preferably forty of the latter in number. The advancing edge of the card engages a second pair of feed rollers 32 and 34 by means of which it is advanced to the first of a series of forty sorting stations.

The reading heads 26, erase heads 28, and writing heads 30 at the card-picker station are connected to and operated by a control circuit 36 in a manner hereinafter more fully described in connection with Fig. 5. The effect of the control circuit 36 is to read out a character stored on the magnetic cards in any pre-selected column and row. Depending on the character stored in this pre-selected position on the magnetic card, a magnetic bit is recorded in an additional horizontal row along the bottom or trailing edge of the card in one of forty positions. This row is referred to as the sorting row. Thus, a magnetic bit is recorded in the sorting row of the card which is indicative of a particular character stored in a pre-selected position on the magnetic card. This magnetic bit written on the edge of the card provides a means for selecting the card for storage in one of the forty card sorting and stacking stations.

After passing through the feed rolls 32 and 34, the card passes through a reading station indicated at 38 including a read head 42 (see Fig. 4) which is positioned relative to the horizontal extent of the magnetic card in a position corresponding to the first of the forty positions in the sorting row. The reading station 38 also includes a reading head 44 (see Fig. 4) which senses the clock pulses along the edge of the card. The reading head 44 opposite the clock track on the card is used to identify the sorting row on the information card. By means of a select circuit 40 connected to the reading heads 42 and 44 only the information in the sorting row of the card is sensed at the reading station 38.

Figure 4:
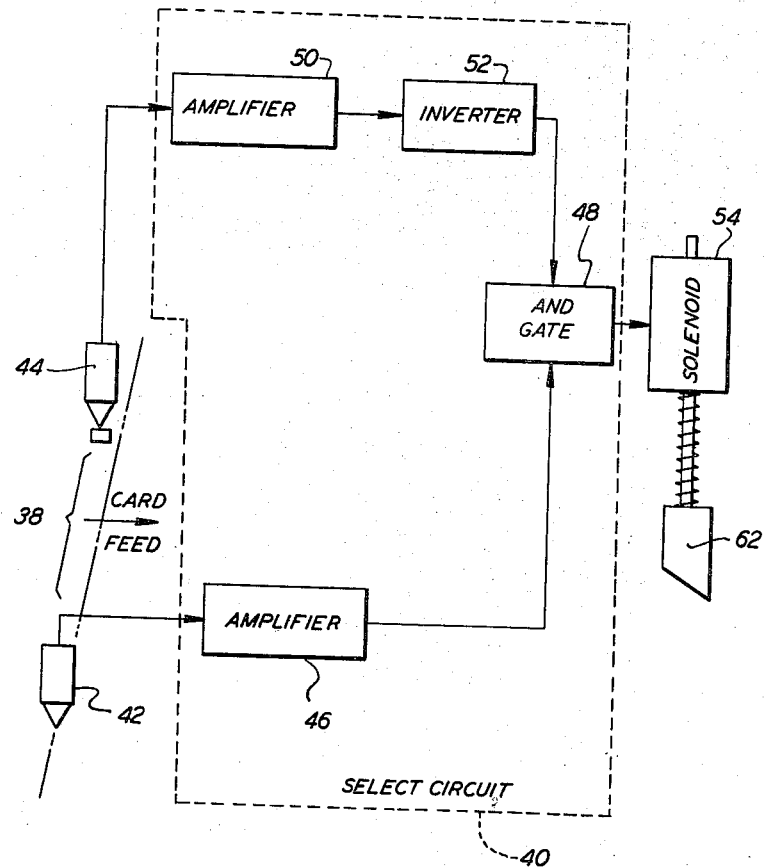
Fig. 4 is a schematic block diagram of the select circuit at each of the sorting stations.

The select circuit is shown in more detail in Fig. 4. The reading head 42 is provided for sensing a magnetic bit recorded in a particular position in the sorting row, while the reading head 44 is provided for sensing the clock pulses in the clock track along the edge of the magnetic card. The output of the reading head 42 is amplified by suitable amplifying means 46 and fed to an "and" gate circuit 48. The output of the read head 44 in turn is fed to an amplifier 50 and through an inverter 52 to the "and" gate 48. Since no clock pulse is provided on the card to delineate the sorting row, no output is provided by the reading head 44 when the sorting row is under the reading station 38. By virtue of the inverter 52, the "and" gate 48 is gated open in response to the read head 44 only when no clock pulse is produced, namely, only when the sorting row passes under the reading head 42. If at this time a magnetic bit is sensed by the reading head 42, a pulse is passed by the "and" circuit 48 to a solenoid 54, the function of which is to activate means to divert the card into a stacking rack, in a manner hereinafter described.

Figure 3:
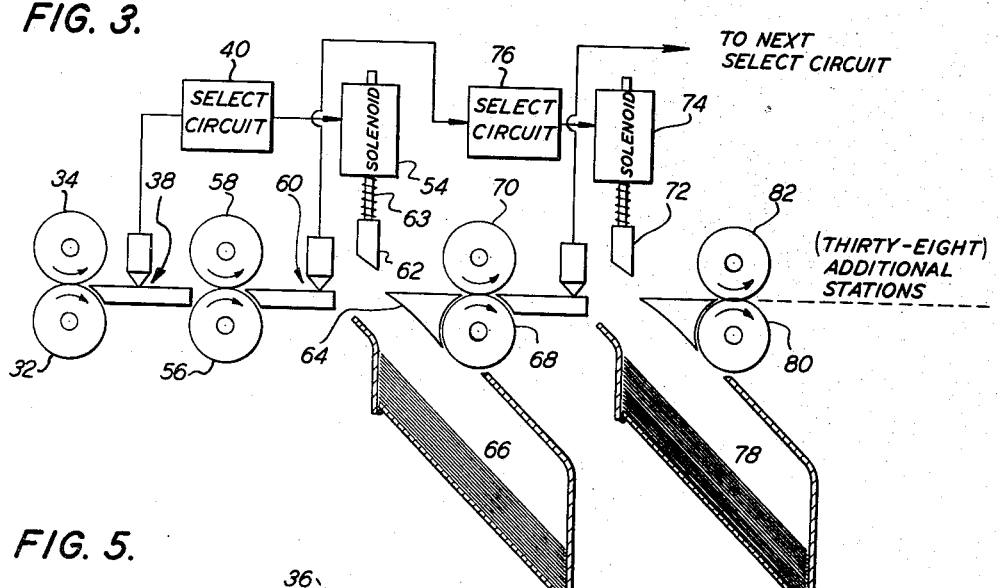
Fig. 3 is a diagrammatic showing of the card sorter.

Referring again to Fig. 3, it will be seen that the magnetic card after passing the reading station 38 is engaged by a next pair of feed rollers 56 and 58 that drive it past a second reading station indicated generally 60. The edge of the card then passes beneath a diverting blade 62 which is actuated in a downward direction by the solenoid 54. If the reading head 42 at the reading station 38 senses a magnetic bit in the sorting row of the magnetic card, the solenoid 54 is energized, pushing the diverting blade 62 downward. The diverting blade 62 forces the edge of the card downwardly so as to engage the lower edge of a wedge-shaped diverting bar 64. As a result the card is deflected downwardly in its forward motion to a stacking rack 66. A spring 63 acts to lift the diverting blade 62 after the solenoid is de-energized.

However, if the solenoid 54 has not been energized, the card is pushed forward by the feed rolls 56 and 58 into a next pair of feed rolls 68 and 70, which direct the card into a second sorting and stacking station which includes a diverting blade 72 actuated by a solenoid 74. The solenoid 74 is energized in response to information read at the reading station 60 through a select circuit 76 identical to the select circuit 40 previously described. The reading head 60 is arranged to sense a magnetic bit in the sorting row in the second of the forty available positions. The diverter blade 72 acts to divert the card into the second stacking station as indicated at 78 if the solenoid 74 is energized in response to information sensed at the reading station 60. If the solenoid 74 is not energized, the card continues through a next pair of feed rolls 80 and 82 by means of which it is fed to the next stacking station (not shown), and so the card continues until it is ultimately diverted into one of forty successive stacking stations according to the position of the magnetic bit stored in the sorting row of the card.

It will be noted that the reading station for each of the sorting and stacking stations is located ahead of the previous stacking station. This is to allow for the time delay normally present in actuating the solenoids to push down the diverting blades, and also to allow for the fact that the diverting blade engages the leading edge of the card, while the reading station senses the sorting row which is at the trailing edge of the card.

Figure 5:
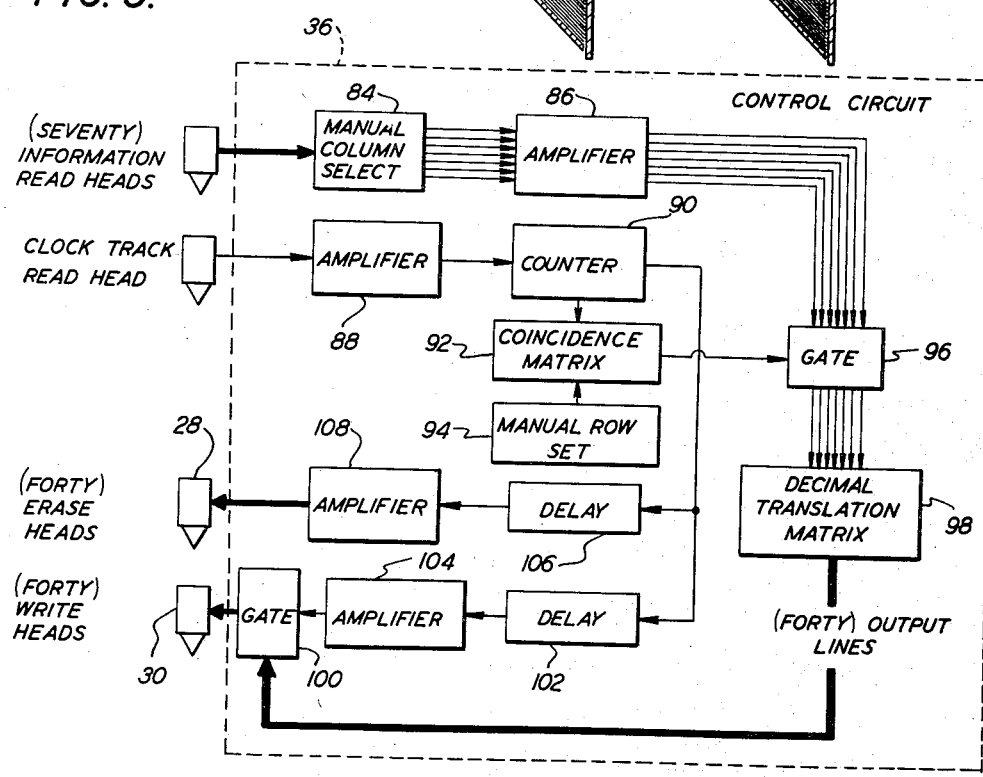
Fig. 5 is a schematic block diagram of the electrical circuitry of the card information sensing station.

Referring to Fig. 5, the control circuit 36 at the card-picking station is shown in more detail. Indicated generally at 84 is a manual column select circuit which comprises a plurality of switches by means of which any group of seven reading heads corresponding to one column on the magnetic card are coupled to a suitable amplifier 86 having seven channels of amplification.

The clock track read head in turn is connected through an amplifier 88 to a counter circuit 90. The counter 90 is connected to a coincidence matrix circuit 92 which is controlled by a manual row set circuit 94. The row set circuit is manually adjusted to select one of the hundred information rows by number. When the electrical pattern on the counter 90, as set by successive clock pulses from the timing track, matches the electrical pattern set up by the row set circuit 94, a coincidence is established by the coincidence matrix circuit 92. The resulting output of the coincidence circuit 92 opens a gating circuit 96, gating the output of the amplifier 86 to a decimal translation matrix circuit 98. The counter 90, coincidence matrix 92, and manual row set 94 as described above are well known in the art. However, suitable circuits for each of these elements are described and shown in detail in the text entitled "Automatic Digital Calculators," second edition, by Booth and Booth, published in 1956 by the Academic Press, Inc., New York 10, New York, on pages 128–132. In Fig. 12.7(a) a similar block representation of these elements are shown wherein the block C is similar in function to the counter 90, the block CS similar to the coincidence matrix 92, and the block ML is similar to the manual row set 94. The detailed circuit diagrams for these elements are shown in Fig. 12.7(b) et seq.

It will be seen that the output of the gate 96 is a binary coded decimal number corresponding to the character stored on the magnetic storage card in a pre-selected position determined by the manual column select 84 and the manual row set 94, which circuits respectively determine in which column and in which row the information on the card is to be sensed.

The decimal translation matrix circuit 98 is a conventional type of matrix or gating circuit which is arranged to selectively energize one of forty different output lines, depending upon the particular two-digit binary coded decimal number coupled from the output of the gate 96. The design of matrix circuits for changing any input condition to any output condition as determined by voltage levels both at the input and output is described in detail in the article "Digital Automation" by M. Kline, F. Williams, and H. Morgan, Instruments and Automation, December 1955, page 2109.

The output of the matrix circuit 98 is coupled to a gating circuit 100. The gating circuit 100 is also coupled to the output of the counter 90 through a delay circuit 102 and an amplifier 104. The counter 90 is arranged to put out a pulse when it counts the last row, i.e. when it counts to a hundred in response to the clock pulses sensed by the clock track read head. This pulse is delayed by the delay circuit 102 for a period of time corresponding to the time required for the sorting row to pass under the write heads 30. The output pulse from the amplifier 104 is gated to a respective one of the forty write heads 30 by means of the gating circuit 100 as determined by which of the forty output lines from the matrix circuit 98 has been energized by the detected information character on the card. The gating circuit 100, for example, may consist of forty "and" circuits, each controlled by a flip-flop, with each of the respective flip-flops being triggered by a corresponding one of the forty output lines from the matrix circuit 98. By this means the corresponding "and" circuit is gated on to pass the pulse from the amplifier 104 to the associated write head 30. The output pulse from the amplifier 104 may be used in the gating circuit 100 to trigger off the flip-flops and close the "and" circuits to reset the gating circuit 100 for the next information card.

From the above description it will be seen that the effect of the control circuit 36 is to sample the information or character stored in a pre-selected position on the information cards as they are fed through the card picker. According to what the character is that is recorded in this position on the card, one of forty positions in the sorting row along the trailing edge of the information card is provided with a magnetic bit, whereby the position of the magnetic bit along the sorting row is indicative of the particular alphanumeric character stored in the pre-selected position on the information card.

As the card is fed through the sorting and stacking stations, only one of the forty stations will respond to the magnetic bit stored in a particular position in the sorting row on each of the information cards. Thus, the cards are sorted out into forty different stacks in response to the particular character stored in a pre-selected position on each of the information cards.

By sensing the information at one position and rewriting the information in terms of a pulse recorded at a particular position in the sorting row, the sensing circuit required at each of the stacking stations may be greatly simplified. Since the sorting information recorded in the sorting row is stored magnetically, it may be easily erased for subsequent sorting under a different selected classification. Erasing of previously recorded sorting information in the sorting row is provided by means of the forty erase heads 28 which are controlled in response to the output of the counter 90 through a delay circuit 106 and amplifier 108. The delay circuit 106 provides a delay between the passing of the last clock pulse under the clock track read head 26 and the time at which the sorting row passes under the erase heads 28.

While the invention has been particularly described in connection with sorting of information cards in which the information is stored magnetically, it is to be understood that the invention may be used in conjunction with cards in which information is stored thereon in other forms, such as in the form of punches. The important feature resides in the recording of sorting information magnetically in response to the stored information in whatever form. By recording the sorting information magnetically, an index is provided by means of which the cards can be easily sorted according to a pre-selected classification. The index, since it is magnetically stored, can easily be erased, to establish a new index for sorting according to a different classification of the information on the cards.

What is claimed is:

1. Apparatus for sorting magnetically coded cards having information characters recorded thereon in binary coded form, the characters being arranged in columns and rows, said apparatus comprising means for reading out consecutively the binary coded characters in a selected column on the card, matrix means for selectively energizing one of a plurality of separate outputs in response to a corresponding one of an equal number of different binary coded characters as read from the card, means for coupling the signal from the read out means to the matrix means during the time of reading out from a pre-selected character position in the selected column, means for selectively writing magnetic bits in one of a plurality of positions in the row below the last row of information characters on the card, the position of the bit being controlled in response to the output of the matrix means, a plurality of card sorting stations, means for moving the cards past said sorting stations, and means associated with each sorting station for detecting said magnetic bits, said means including means for actuating the sorting station to remove and store any card having a bit stored in a predetermined position on the card in said row below the last row of information characters.

2. Apparatus for sorting cards having information characters recorded thereon in binary coded form, the characters being arranged in columns and rows, said apparatus comprising means for reading out consecutively the binary coded characters in a selected column on the card, matrix means for selectively energizing one of a plurality of separate outputs in response to a corresponding one of an equal number of different binary coded characters as read from the card, means for coupling the signal from the read out means to the matrix means during the time of reading out from a pre-selected character position in the selected column, means for selectively writing magnetic bits in one of a plurality of predetermined positions on the card, the position of the bit being controlled in response to the output of the matrix means, a plurality of card sorting stations, means for moving the cards past said sorting stations, and means associated with each sorting station for detecting said magnetic bits, said means including means for actuating the sorting station to remove and store any card having a bit stored in a predetermined position on the card.

3. Apparatus for sorting magnetically coded cards having information characters recorded thereon, the characters being arranged in columns and rows, said apparatus comprising means for reading out consecutively the characters in a selected column on the card, means coupled to the readout means for selectively energizing one of a plurality of separate outputs in response to a corresponding one of an equal number of different characters as read from the selected column on the card, means for selectively writing magnetic bits in one of a plurality of predetermined positions on the card, the position of the bit being controlled in response to said one of a plurality of outputs, a plurality of card sorting stations, means for moving the cards past said sorting stations, and means associated with each sorting station for detecting said magnetic bits, said means including means for actuating the sorting station to remove and store any card having a bit stored in a predetermined position on the card.

4. Apparatus for sorting record members having information characters recorded thereon, the characters being arranged in columns and rows, said apparatus comprising means for reading out consecutively the characters in a selected column on the record member, means coupled to the readout means for selectively energizing one of a plurality of separate outputs in response to a corresponding one of an equal number of different characters as read from the selected column on the record member, means for selectively recording indexing marks in one of a plurality of predetermined positions on the record member, the position of the mark being controlled in response to said one of said plurality of outputs, a plurality of sorting stations, means for moving the record members past said sorting stations, and means associated with each sorting station for detecting said indexing marks, said means including means for actuating the sorting station to remove and store any record member having a mark stored in a predetermined position on the record member.

5. Apparatus for sorting record members having information characters recorded at a plurality of different areas thereon, said apparatus comprising means for selecting an area on the record member to be read, means for reading out the information characters recorded at the selected area of each record member, means coupled to the read-out means for selectively energizing one of a plurality of separate outputs in response to a corresponding one of an equal number of different characters as read from the selected area on the record member, means for selectively writing erasable sorting marks in one of a plurality of predetermined positions on the record member, the position of the mark being controlled in response to said one of said plurality of separate outputs, a plurality of sorting stations, means for moving the record members past said sorting stations, and means associated with each sorting station for detecting said erasable sorting marks, said means including means for actuating the sorting station to remove and store any record member having a sorting mark stored in a predetermined position corresponding to the character read out at the selected area on the record member.

References Cited in the file of this patent

UNITED STATES PATENTS

| | | |
|---|---|---|
| 1,955,819 | Maul | Apr. 24, 1934 |
| 2,091,048 | Lasker | Aug. 24, 1937 |
| 2,107,008 | Lasker | Feb. 1, 1938 |
| 2,120,233 | Daly et al. | June 14, 1938 |
| 2,211,094 | Braun | Aug. 13, 1940 |
| 2,254,931 | Bryce | Sept. 7, 1941 |
| 2,306,211 | Geiss | Dec. 22, 1942 |
| 2,614,169 | Cohen et al. | Oct. 14, 1952 |
| 2,697,514 | Stahl | Dec. 21, 1954 |

FOREIGN PATENTS

| | | |
|---|---|---|
| 1,109,452 | France | Sept. 28, 1955 |